United States Patent
Fischer et al.

(10) Patent No.: US 10,900,505 B2
(45) Date of Patent: Jan. 26, 2021

(54) LINE RUPTURE SAFEGUARD FOR A HYDRAULIC CYLINDER

(71) Applicant: Jungheinrich Aktiengesellschaft, Hamburg (DE)

(72) Inventors: Kai Fischer, Hamburg (DE); Johannes Michael Frey, Louisenhof (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 57 days.

(21) Appl. No.: 16/288,212

(22) Filed: Feb. 28, 2019

(65) Prior Publication Data
US 2019/0264715 A1 Aug. 29, 2019

(30) Foreign Application Priority Data
Feb. 28, 2018 (DE) .......................... 10 2018 104 587

(51) Int. Cl.
| | | |
|---|---|---|
| F16K 17/30 | (2006.01) | |
| F15B 20/00 | (2006.01) | |
| F15B 13/02 | (2006.01) | |
| F15B 15/20 | (2006.01) | |
| B66F 9/22 | (2006.01) | |

(52) U.S. Cl.
CPC .............. *F15B 20/005* (2013.01); *B66F 9/22* (2013.01); *F15B 13/023* (2013.01); *F15B 15/204* (2013.01); *F16K 17/30* (2013.01); *F15B 2211/8636* (2013.01)

(58) Field of Classification Search
CPC .............. F15B 13/023; F15B 15/204; F15B 2211/8636; F15B 20/005; Y10T 137/7785; Y10T 137/776; Y10T 137/86485; Y10T 137/7754; Y10T 137/7728; B66F 9/22
See application file for complete search history.

(56) References Cited

U.S. PATENT DOCUMENTS

| | | | | |
|---|---|---|---|---|
| 3,074,384 A | * | 1/1963 | Pilch ....................... | F15B 13/01 91/420 |
| 3,128,783 A | * | 4/1964 | Cowles ................ | G05D 7/0193 137/115.06 |

(Continued)

FOREIGN PATENT DOCUMENTS

| | | |
|---|---|---|
| CN | 104006195 A | 8/2014 |
| CN | 105240331 A | 1/2016 |

(Continued)

OTHER PUBLICATIONS

EP 20190158785; filed Feb. 22, 2019; EP Search Report; dated Aug. 5, 2019 (11 pages).

*Primary Examiner* — Jessica Cahill
(74) *Attorney, Agent, or Firm* — Barclay Damon LLP

(57) ABSTRACT

A line rupture safeguard for a hydraulic cylinder that has a connecting line between a connection for the hydraulic cylinder and a connection for a hydraulic unit, wherein a spring-biased closure unit in the connecting line is biased in a position releasing the connecting line, and at least partially closes the connecting line when a pressure differential in the connecting line is exceeded. A movable cam follower is provided that has a curved section which interacts with the spring-biased closure unit, and whose position dictates the spring bias of the closure unit and the pressure differential for at least partially closing the closure unit.

17 Claims, 1 Drawing Sheet

(56) References Cited

U.S. PATENT DOCUMENTS

| | | | |
|---|---|---|---|
| 3,228,658 A | | 1/1966 | London |
| 3,589,384 A | * | 6/1971 | Eckert .................... F02M 69/22 |
| | | | 137/88 |
| 3,631,893 A | * | 1/1972 | Seaman ................ F16K 17/168 |
| | | | 137/630 |
| 3,801,151 A | * | 4/1974 | Reynolds ............... B62D 33/07 |
| | | | 296/190.05 |
| 3,807,442 A | | 4/1974 | Sumner et al. |
| 5,375,620 A | * | 12/1994 | Ginder, Jr. ........... G05D 11/006 |
| | | | 137/115.09 |
| 6,019,115 A | * | 2/2000 | Sanders .................. F16K 17/30 |
| | | | 137/10 |
| 9,581,228 B2 | * | 2/2017 | Nashery ............ F16K 31/52408 |
| 2004/0011406 A1 | | 1/2004 | Weber |
| 2008/0178946 A1 | * | 7/2008 | Lea-Wilson ............ F16K 17/30 |
| | | | 137/460 |
| 2018/0259078 A1 | * | 9/2018 | Li .......................... F16K 17/30 |

FOREIGN PATENT DOCUMENTS

| | | |
|---|---|---|
| CN | 106402087 A | 2/2017 |
| DE | 19369 A1 | 7/1960 |
| DE | 56605 A | 7/1960 |
| DE | 56605 A1 | 10/1966 |
| DE | 2507313 A1 | 9/1976 |
| DE | 19511524 A1 | 10/1996 |
| DE | 202012009568 U1 | 1/2014 |
| EP | 1311781 | 8/2001 |

\* cited by examiner

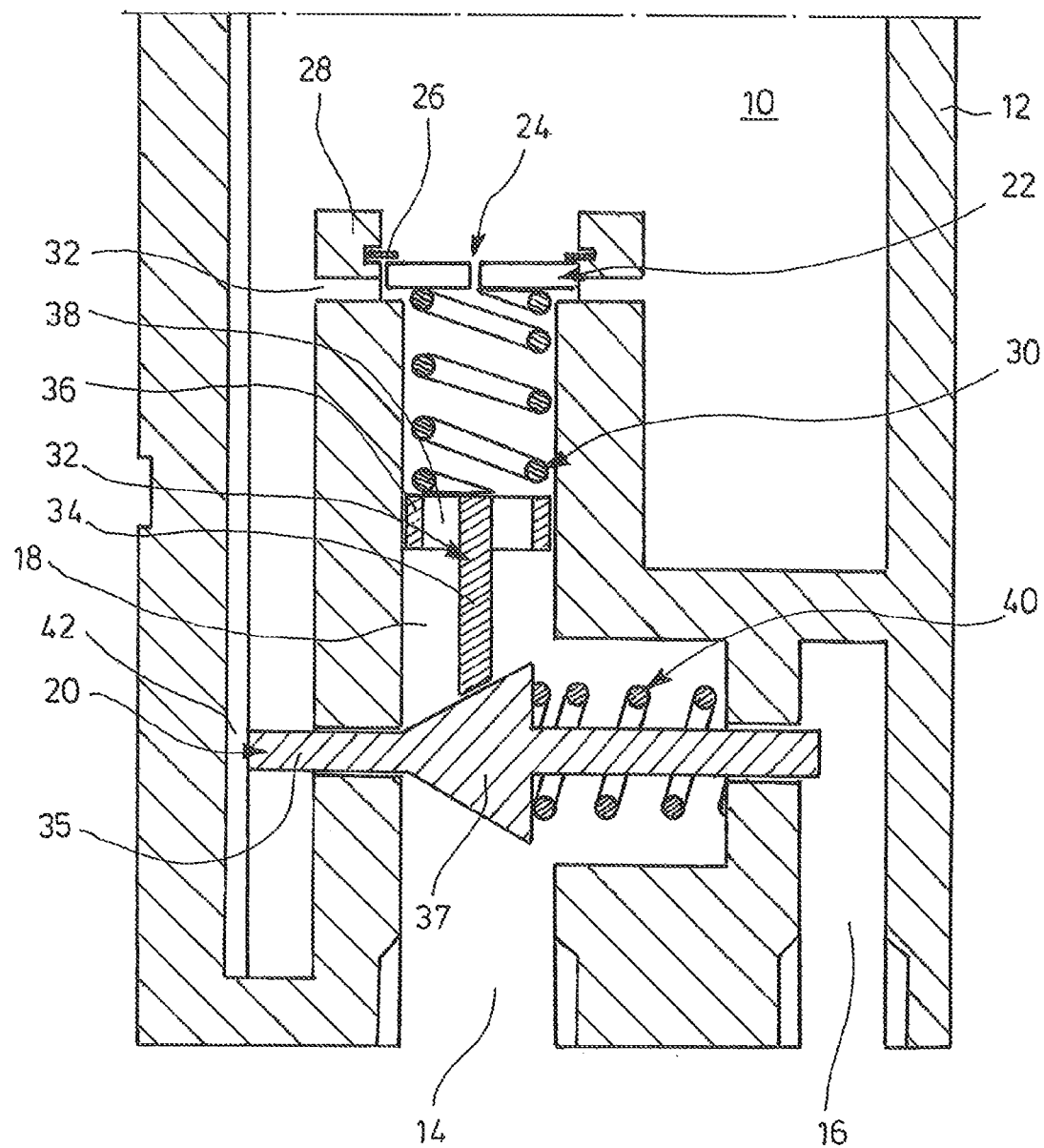

LINE RUPTURE SAFEGUARD FOR A HYDRAULIC CYLINDER

CROSS REFERENCE TO RELATED DISCLOSURE

This application is based upon and claims priority to, under relevant sections of 35 U.S.C. § 119, German Patent Application No. 10 2018 104 587.5, filed Feb. 28, 2018, the entire contents of which are hereby incorporated by reference.

BACKGROUND

The present disclosure relates to a line rupture safeguard for a hydraulic cylinder. The line rupture safeguard is provided adjacent to an interior of the hydraulic cylinder, for example in a connecting line between a connection for the hydraulic cylinder and a connection for a hydraulic unit.

Line rupture safeguards, also termed pipe rupture safeguards, belong to a group of stop valves that for example are installed directly on the cylinder. They prevent uncontrolled cylinder movement in the case of a pipe rupture or a hose breakage. In a normal embodiment, larger volumetric flows cause a valve plate that is lifted off the valve seat by spring forces to be pressed against its seat by the flow forces and thereby close the valve. A diaphragm hole in the valve plate can also be provided that allows a small volumetric flow in the locking direction. The flow forces that cause the valve to close can be considered a pressure differential at the valve plate, wherein the upstream pressure, i.e., on the side of the lift cylinder, is greater than the downstream pressure, so that the pressure differential resulting therefrom generates a force directed downstream, which causes the line rupture safeguard to respond.

A disadvantage of known line rupture safeguards, in particular for industrial trucks, has proven to be that the pressure differential is fixed at which is the line rupture safeguard responds, and therefore limits the possibilities for use.

BRIEF SUMMARY OF THE DISCLOSURE

A line rupture safeguard assembly is provided for a hydraulic cylinder including a piston that can be hydraulically moved. The line rupture safeguard possesses a spring-biased closure unit that is arranged adjacent to the interior of the hydraulic cylinder. The closure unit is biased in a releasing position so that a specific volume flows through the closure unit. When a pressure differential at the closure unit is exceeded, it closes at least partially. The line rupture safeguard according to the disclosure possesses a movable actuator whose position relative to the closure unit sets the spring bias to the releasing position of the closure unit. The required pressure differential for the at least partial closing of the closure unit is set by the spring bias. The use of a movable actuator makes it possible to adjust the spring bias by its position during operation. An adjustable spring bias can enable the required pressure differential for at least partially closing the closure unit to be adjustable. The movable actuator provided according to the disclosure is displaceable according to the disclosure during operation. This yields great flexibility when using and applying the line rupture safeguard since the pressure differential and hence the response point of the line rupture safeguard can also be adjusted in an installed state by adjusting the actuator.

Preferably, the movable actuator assumes its position relative to the closure unit depending on a pressure, in particular on a pressure in the interior of the hydraulic cylinder. In this context, the pressure preferably acts like a force on the movable actuator which assumes a position relative to the closure unit under the effect of the force. A pressure and/or load-dependent line rupture safeguard thereby results.

In a preferred embodiment, the actuator possesses a movable cam follower that has a curved section which interacts with the spring-biased closure unit. The curved section converts a movement of the cam follower into a spring-biasing of the closure unit.

Preferably, the actuator possesses an active end that interacts with the hydraulic cylinder and in particular with the interior of the hydraulic cylinder and determines the position of the actuator and hence in particular the curved section depending on the pressure in the interior of the hydraulic cylinder. It can thereby be realized that the line rupture safeguard defines the pressure differential for its response depending on a pressure in the hydraulic cylinder. Various functional relationships between the pressure in the hydraulic cylinder and pressure differential for the response of the line rupture safeguard can be realized by the curved section.

In a preferred embodiment, the actuator is spring-biased in a position in which the pressure differential for at least partially closing the closure unit is at a maximum. The actuator assumes this spring-biased position when a reduced or no pressure acts on the actuator in the interior of the hydraulic cylinder. The maximum pressure differential in this case means that without additional pressure from the interior of the hydraulic cylinder, the line rupture safeguard reacts late, i.e., only reacts given a large pressure differential and a large volumetric flow through the closure unit.

One useful development of the line rupture safeguard according to the disclosure provides that the actuator increasingly assumes a position against its spring force by its active end as pressure increases in the hydraulic cylinder where the pressure differential for at least partially closing is less than the maximum pressure differential. This means that when there is greater pressure in the interior of the hydraulic cylinder, a smaller pressure differential than the maximum is sufficient for the line rupture safeguard to respond. The line rupture safeguard responds earlier, i.e., given a smaller pressure differential and a small volumetric flow through the closure unit.

One development according to the disclosure provides that the pressure differential for at least partially closing the closure unit can be continuously adjusted depending on a pressure in the hydraulic cylinder. By means of the active end of the actuator, the pressure in the hydraulic cylinder acts in this case against the spring force and thereby allows the pressure differential to be adjusted by the position of the actuator when a force equilibrium arises at the actuator.

This usefully provides that a minimum pressure differential is sufficient for partially closing the closure element for a pressure that is equal to or greater than a predetermined limit pressure in the hydraulic cylinder. This means that when the pressure in the hydraulic cylinder exceeds the predetermined limit pressure, a minimum pressure differential is always sufficient for partially closing the closure unit. Conversely, this means that when a pressure in the interior of the hydraulic cylinder is less than the predetermined limit pressure, pressure differentials can also arise that are greater than the minimum pressure differential without triggering the closure unit.

In a preferred embodiment, the closure unit consists of a closure plate that is biased by a spring in a releasing position against a stop and is pressed by a pressure in the hydraulic cylinder into a closing position when the pressure differential preset by the spring is exceeded. The force actuating the closure plate results from the difference between the pressures acting on the top and bottom.

In a preferred embodiment, the spring that tensions the closure plate against the stop is arranged on a tappet whose end facing away from the spring interacts with the actuator. In principle, the spring can also interact directly with the actuator; however, inserting a tappet enables in this case specific positioning of the spring and the associated spring bias for the closure plate.

Preferably, the foot end of the tappet tensioning the spring of the closure unit is mounted on a curved section of the actuator and can reposition thereupon. The actuator preferably possesses an active end that projects into the interior of the hydraulic cylinder and preferably captures the pressure in the interior and is adjusted in its position thereby. In a useful embodiment, the curved section is designed to be conical.

The line rupture safeguard according to the disclosure is particularly suitable for use in a hydraulic lift cylinder of an industrial truck. Preferably, the limit pressure of the line rupture safeguard in such an industrial truck can be selected such that it corresponds to the pressure in the interior of the hydraulic cylinder at a rated load. Consequently, the line rupture safeguard responds with a minimum pressure differential when the lift cylinder is loaded at a rated load or a higher load. This minimum pressure differential at a rated load then determines the maximum lowering speed of the lift cylinder. If the lift cylinder is contrastingly not loaded with a rated load, faster lowering speeds can also occur without the line rupture safeguard responding.

BRIEF DESCRIPTION OF THE DRAWINGS

FIG. 1 is a sectional view of hydraulic cylinder having a line rupture safeguard unit disposed at the base of the cylinder.

DETAILED DESCRIPTION OF THE DISCLOSURE

The present disclosure will be further explained with reference to an exemplary embodiment. In FIG. 1, a line rupture safeguard assembly is disposed internally of the hydraulic cylinder 10. More specifically, the line rupture safeguard is in the foot region of the hydraulic cylinder 10. The interior of the hydraulic cylinder 10 is surrounded by a cylindrical wall 12. In the foot region, a drain line 14 is provided through which hydraulic fluid can be discharged from the cylinder interior 10 through a connecting line 18. Another line is provided as a leakage line 16 for the hydraulic fluid in conjunction with a cam follower 20. The cam follower 20 forms the actuator for the line rupture safeguard.

The line rupture safeguard possesses a closure plate 22 that is arranged in the connecting line 18 adjacent to the interior 10 of the hydraulic cylinder. The closure plate 22 possesses a central hole 24 that ensures drainage of the hydraulic fluid, even in a closed position of the closure plate 22. In the depicted position, the closure plate 22 is pressed against a stop 26. The stop 26 is formed by a peripheral ring that is arranged in a closure seat 28. The closure plate 22 is biased against the stop 26 by a spring 30. This releases the connecting line 18 via the connecting channels 31. The connecting channels 31 are introduced into the closure seat 28 in a radial direction. Accordingly, the hydraulic cylinder 10 is in fluid communication with the connecting line 18 by means of at least two radially-oriented connecting channels 31 along with a central hole 24 through the closure plate 22.

The closure plate 22 together with the spring 30 function like a conventional line rupture safeguard: if a line rupture exits at the connection 14, an uncontrolled movement of the piston (not shown) in the hydraulic cylinder is prevented since the closure plate 22 is pressed into the closure seat 28 against the spring force 30. In this case, the hydraulic fluid can only exit through a central hole 24 which causes a slow lowering. In the event of a line rupture, the flow speed of the hydraulic fluid at the closure plate is large enough, i.e., the pressure differential between the side of the closure plate lying upstream and the side lying downstream is large enough for the closure plate to be pressed into the closure position against the force of the spring 30.

In one embodiment, the line rupture safeguard assembly comprises the movable actuator 20 disposed in combination with a tappet assembly. The tappet assembly includes a tappet 32, a tappet shaft 34 and a tappet head 36. The tappet head 36 comprises one or more through-holes 38 to accommodate flow of hydraulic fluid in the connecting line 18. A biasing spring 30 is seated on the tappet head 36 which spring 30 is adjusted relative to the closure plate 22 by the position of the tappet 32 in the connecting line 18, i.e., relative to the closure plate 22. That is, the spring displacement or position of the tappet 32 determines spring force applied to the closure plate 22 and the required pressure differential for closing the closure plate 22. That is, the closer the tappet 32 to the closure plate 22, the greater the spring bias by means of which the closure plate 22 is pressed against the stop 26. The pressure differential for adjusting the connecting line 28 is thereby increased, i.e., the pressure in the cylinder interior 10 must be greater in the event of a line rupture for the line rupture safeguard to respond.

If, in contrast, the tappet 32 is adjusted to be further away from the closure plate 22, the spring tension of the spring 30 is reduced, and the line rupture safeguard responds at a lower pressure differential. The tappet 32 abuts by its shaft 34 against a cam follower 20. The cam follower 20 possesses a shaft 35 and a curved section 37. The curved section 37 is designed to be conical. The cam follower 20 is biased by a spring 40 in a position in which the tappet 32 is adjusted to be relatively close to the closure plate 22 and the spring bias is at a maximum.

The shaft 35 extends into the cylinder interior and forms an active end 42 there. The cam follower 20 is adjusted against the spring force of the spring 40 by the pressure of the hydraulic fluid in the cylinder interior 10 so that the tappet 22 is adjusted by the curved section 38, and the pressure differential is accordingly adjusted for the response of the closure plates 22. The conical tip of the curved section 37 also has an active end 42. This yields a pressure-dependent line rupture safeguard for the hydraulic cylinder.

The leakage line 16 is provided to capture hydraulic fluid exiting the connecting line 18 via the spring-side bearing of the cam follower 20.

One special use of a pressure-dependent line rupture safeguard that is controlled depending on pressure is in industrial trucks, in particular in a lift frame in this context. In addition to use in a lift frame, the line rupture safeguard according to the disclosure can also be employed for a load cylinder. When used in a lift frame, a plurality of lifting masts are provided that telescope relative to each other by a mast lift cylinder. Furthermore, the lift frame also possesses a free lift cylinder by means of which a load support means is lifted. Generally, all hydraulic cylinders of a lift frame are equipped with a line rupture safeguard that responds at a given lowering speed. The lowering speed is established by a standard for the case of the rated load, for example 0.6 m $s^{-1}$. With the assistance of a pressure-dependent line rupture safeguard, it is possible to provide a faster lowering speed for a lift frame that is not laden with a rated load, or an empty lift frame. The cam follower 20 is adjusted by a large pressure in the interior of the hydraulic cylinder so that the closure plate 22 is pressed into its closing position even when there is a small pressure differential. This then dictates the lowering speed for the rated load. If the load is less than the rated load, the tappet 32 is adjusted by the spring 40 to be closer to the closure plate 22, and the closure plate 22 only responds to close the connecting line 18 at a greater lowering speed or pressure differential.

LIST OF REFERENCE SIGNS

10 Interior
12 Wall
14 Exit line
16 Leakage line
18 Connection line
20 Actuator, in particular cam follower
22 Closure line
24 Hole
26 Stop
28 Closure seat
30 Spring/spring force
32 Tappet
34 Shaft
35 Shaft
36 Tappet head
37 Curved section
38 Curved section
40 Spring

The invention claimed is:

1. A line rupture safeguard for a hydraulic cylinder comprising:
 a closure unit comprising a closure plate and disposed adjacent to an interior surface of the hydraulic cylinder, wherein the interior surface defines an interior of the hydraulic cylinder;
 a movable actuator configured to bias the closure unit in a releasing position to at least partially close the closure unit; and
 a first spring,
wherein the closure plate is biased by the first spring in the releasing position against a stop, and is pressed, by a pressure in the hydraulic cylinder, into a closing position when a pressure differential, preset by the first spring, is exceeded.

2. The line rupture safeguard according to claim 1, wherein a position of the movable actuator is varied depending on a pressure in the interior of the hydraulic cylinder.

3. The line rupture safeguard according to claim 1, wherein a position of the movable actuator is adjusted depending on one of a pressure and a load.

4. The line rupture safeguard according to claim 1, wherein the actuator includes a movable cam follower having a curved section that interacts with the closure unit.

5. The line rupture safeguard according to claim 1, wherein the actuator has an active end which is positioned in response to pressure within the hydraulic cylinder.

6. The line rupture safeguard according to claim 5, wherein, as the pressure in the interior of the hydraulic cylinder increases, the actuator increasingly assumes a position against its spring force.

7. The line rupture safeguard according to claim 6, wherein a pre-determined limit pressure is provided, and wherein a minimum pressure differential for partially closing the closure unit is greater than the pre-determined limit pressure.

8. The line rupture safeguard according to claim 1, wherein the actuator is spring-biased, when there is a pressure differential in the interior of the hydraulic cylinder, and changes position when the pressure differential, for at least partially closing the closure unit, is at a maximum.

9. The line rupture safeguard according to claim 1, wherein the pressure differential for at least partially closing the closure unit continuously adjusts depending on a pressure in the hydraulic cylinder.

10. The line rupture safeguard according to claim 1, wherein the first spring that compresses the closure plate against the stop is seated on a tappet whose foot end faces away from the first spring interacts with the actuator.

11. The line rupture safeguard according to claim 10, wherein the foot end is mounted on a curved section of the actuator.

12. The line rupture safeguard according to claim 11, wherein the curved section of the actuator is configured to be conical and contact a second spring.

13. The line rupture safeguard according to claim 1, wherein a shaft of the actuator projects into the interior of the hydraulic cylinder as an active end.

14. The line rupture safeguard according to claim 1, wherein as the pressure in the hydraulic cylinder increases, a spring force required to cause the moveable actuator to respond decreases.

15. A line rupture safeguard for a hydraulic cylinder comprising:
 a closure unit disposed adjacent to an interior surface of the hydraulic cylinder, the closure unit having a closure plate that is biased by a spring in a releasing position against a stop, the closure plate being pressed, by a pressure in the hydraulic cylinder, into a closing position when a pressure differential, preset by the spring, is exceeded;
 the spring compressing the closure plate against the stop being seated on a tappet, the tappet having a foot end facing away from the spring; and
 a movable actuator configured to bias the closure unit in a releasing position to at least partially close the closure unit;
 the actuator having a conical section slideably mounted to the cylinder by coaxial shafts projecting from each end of the conical section;
 wherein a position of the movable actuator is varied depending on the pressure within the hydraulic cylinder acting on an active end of the conical section.

16. The line rupture safeguard according to claim 15, wherein as the pressure in hydraulic cylinder increases, the spring force required to cause the moveable actuator to respond decreases.

17. The line rupture safeguard according to claim 15, wherein the pressure differential for at least partially closing the closure unit continuously adjusts depending on the pressure in the hydraulic cylinder.

* * * * *